United States Patent
Boutnaru

(10) Patent No.: US 11,076,291 B2
(45) Date of Patent: Jul. 27, 2021

(54) EMULATED MOBILE DEVICE IDENTIFICATION

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

( * ) Notice: Subject to any disclaimer, the term of this patent is extended or adjusted under 35 U.S.C. 154(b) by 172 days.

(21) Appl. No.: 15/403,147

(22) Filed: Jan. 10, 2017

(65) Prior Publication Data

US 2018/0199199 A1    Jul. 12, 2018

(51) Int. Cl.
  *G06F 7/04*     (2006.01)
  *G06F 15/16*    (2006.01)
  *G06F 17/00*    (2019.01)
  *H04L 29/06*    (2006.01)
  *H04W 12/08*    (2021.01)

(52) U.S. Cl.
  CPC .......... *H04W 12/08* (2013.01); *H04L 63/10* (2013.01)

(58) Field of Classification Search
  CPC ..... H04L 63/08; H04L 63/10; H04L 63/1433; H04L 29/06; H04W 12/08; G06F 9/455
  USPC ........................................................ 726/4
  See application file for complete search history.

(56) References Cited

U.S. PATENT DOCUMENTS

| | | | |
|---|---|---|---|
| 9,667,613 B1* | 5/2017 | Wisemon | H04L 63/08 |
| 2008/0276092 A1* | 11/2008 | Eberhardt | H04L 9/3236 |
| | | | 713/175 |
| 2013/0197859 A1* | 8/2013 | Albano | G06K 9/00369 |
| | | | 702/150 |
| 2015/0200776 A1* | 7/2015 | Kao | H04L 9/0844 |
| | | | 713/171 |
| 2015/0205955 A1* | 7/2015 | Turgeman | G06F 21/552 |
| | | | 726/7 |
| 2017/0251366 A1* | 8/2017 | Perna | H04W 12/06 |
| 2017/0277891 A1* | 9/2017 | Keppler | H04L 63/1433 |

* cited by examiner

*Primary Examiner* — Trong H Nguyen
*Assistant Examiner* — Kevin Ayala

(57) ABSTRACT

According to an aspect of an embodiment of the present disclosure, operations related to emulated mobile device determinations may include obtaining sensor data associated with an entity. The sensor data may include sensor output values associated with one or more sensors of a physical mobile device. The operations may also include analyzing the obtained sensor data. The analyzing may include performing one or more determinations. The determinations may include determining whether the obtained sensor data includes static data. The determinations may also include determining whether the obtained sensor data includes computer-simulated data. In addition, the determinations may include determining whether the obtained sensor data includes reused sensor data. In some embodiments, the operations may include determining whether the obtained sensor data includes emulated sensor data based on one or more of the determinations.

20 Claims, 4 Drawing Sheets

EMULATED MOBILE DEVICE IDENTIFICATION

FIELD

Embodiments of the disclosure relate to emulated mobile device identification.

BACKGROUND

Mobile devices may be emulated to perform attacks on service provider systems of networks. Applicant recognizes a need for differentiating between physical mobile devices and emulated mobile devices to improve network security.

BRIEF DESCRIPTION OF THE DRAWINGS

Example embodiments will be described and explained with additional specificity and detail through the use of the accompanying drawings in which.

DETAILED DESCRIPTION

Figure 1:
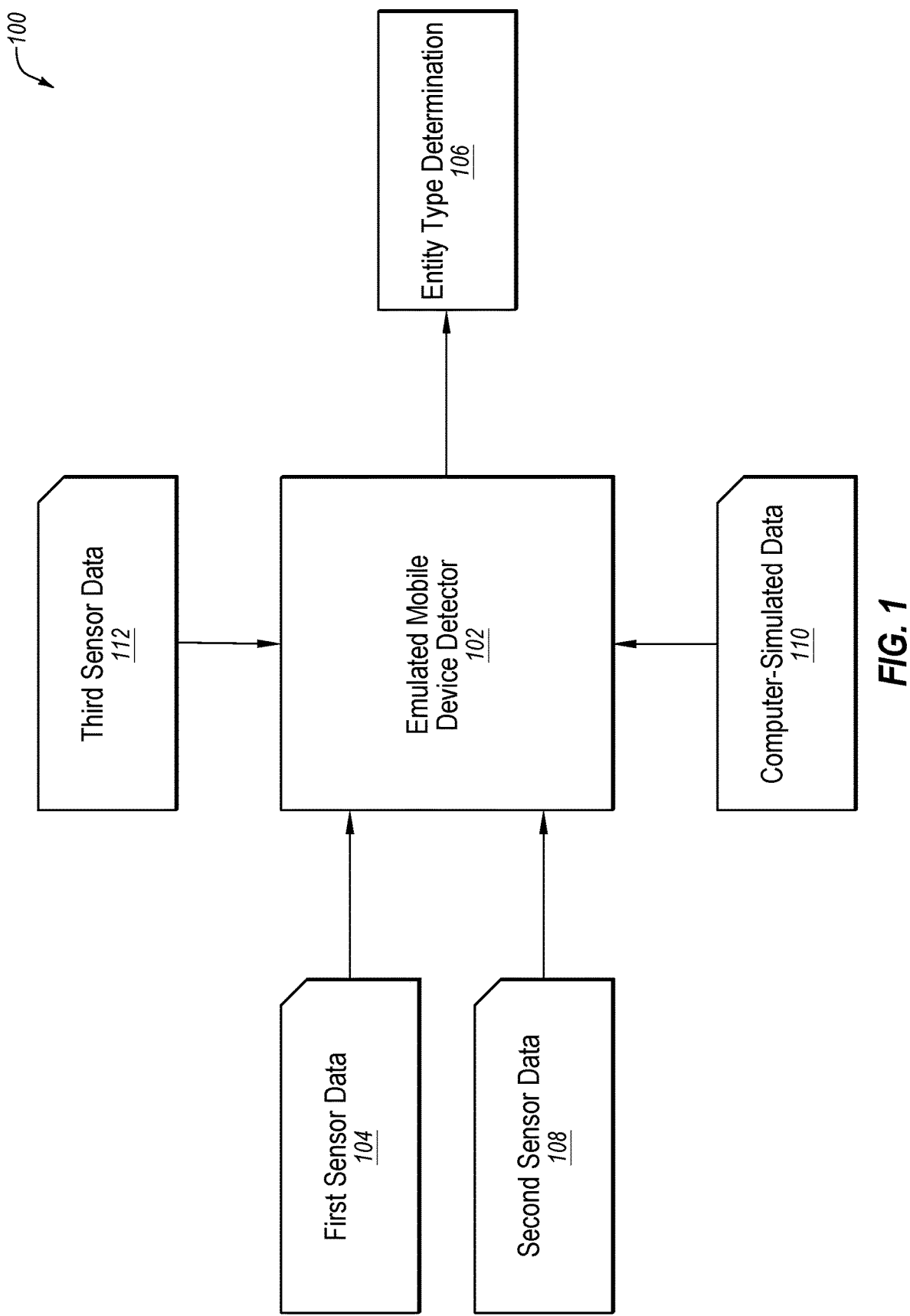
FIG. 1 is a diagram illustrating an example system that may be used to identify a potential emulated mobile device.

Physical mobile devices may include a mobile device platform (e.g., Android®, iOS®, etc.) on which one or more mobile software applications ("mobile applications") may be installed. Additionally, in some instances, a particular mobile application may correspond and be specific to a particular service provider (e.g., PAYPAL) that may offer network-based services via, for example, a website. The particular mobile application may be used to access, via a network such as the Internet, a particular service provider system (e.g., a server system) of the particular service provider.

Emulation software may be configured to mimic a physical mobile device by running or appearing to run a particular mobile device platform and one or more mobile applications to generate an emulated mobile device. The emulated mobile device may appear as a physical mobile device to third-parties (e.g., service provider systems) but may not be an actual physical mobile device. In some instances, a single computing system may run emulation software to create multiple emulated mobile devices at the same time. Further, mobile applications of an emulated mobile device may be more easily modified than mobile applications of physical mobile devices.

Emulated mobile devices may have legitimate uses for testing and debugging software, however, emulated mobile devices may also be generated for nefarious purposes and may create an attack vulnerability for service provider systems. For example, as indicated above, the particular service provider system may be accessed via the particular mobile application. In some instances, a large number of emulated mobile devices running or appearing to run the particular mobile application may be generated and used in a denial of service attack. Additionally or alternatively, emulated mobile devices may be configured to tamper with one or more interfaces of the particular mobile application, such as by modifying data presented to the particular service provider system to obtain potentially sensitive data from the particular service provider system. As such, detection of emulated mobile devices may help reduce attack vulnerabilities of service provider systems.

In accordance with one or more example embodiments, potential emulated mobile devices may be identified based on sensor data. For example, as detailed below, physical mobile devices may include one or more sensors that may generate sensor data that may indicate, for example, movement, a location, a surrounding environment, an orientation, etc., of the physical mobile devices. Additionally, as also detailed below, emulated mobile devices may generate or obtain data that may be presented as "sensor data" of the emulated mobile devices to improve the appearance of being physical mobile devices. In the disclosure, reference to data used by emulated mobile devices as "sensor data" may be referred to as "emulated sensor data." As explained in detail below, emulated sensor data may have characteristics that indicate that it is emulated. As such, according to some embodiments of the disclosure, a determination may be made as to whether sensor data includes emulated sensor data based on one or more characteristics of emulated sensor data. Additionally or alternatively, it may be determined whether an entity, from which the sensor data is obtained, is a physical mobile device or an emulated mobile device based on the determination of whether the sensor data includes emulated sensor data. In these or other embodiments, access to a network service provider system may be based on the determination of whether the entity is a physical mobile device or an emulated mobile device.

One or more example embodiments are explained with reference to the accompanying drawings.

FIG. 1 is a diagram illustrating an example system 100 that may be used to identify a potential emulated mobile device. The system 100 may be arranged according to one or more embodiments, such as one or more of the example embodiments disclosed below. As detailed below, the system 100 may include an emulated mobile device detector 102 ("detector 102") configured to obtain first sensor data 104 that may be associated with an entity. In some embodiments, the detector 102 may also be configured to determine whether or not the entity is an emulated mobile device or a physical mobile device based on the first sensor data 104 and may output the determination as an entity type determination 106.

The first sensor data 104 may include sensor data that may be obtained from an entity that may be a physical mobile device or an emulated mobile device. The first sensor data 104 may accordingly include emulated sensor data in some instances. In some embodiments, it may be undetermined whether the first sensor data 104 includes emulated sensor data as detailed below.

The first sensor data 104 may include one or more values that may represent the output of one or more sensors that may be included in a physical mobile device. Values that represent output of sensors may be referred to as "sensor output values" in the disclosure. Additionally, sensor output values that represent the output of sensors may be referred to as being associated with the sensors even if the sensor output values are not derived from actual output of the sensors. In some embodiments, the first sensor data 104 may include sensor output values that may be associated with sensors whose output may change often due to the mobile nature of the physical mobile devices. Additionally or alternatively, the first sensor data 104 may include sensor output values and/or combination of sensor output values that may be associated with sensors whose output at any given time and/or range of time for a particular physical mobile device may be relatively unique as compared to the output of the same or similar sensors for another physical mobile device. As detailed below, the often changing and/or relatively unique nature of sensor output values (when the sensor output values are from actual sensors) included in the first sensor data 104 may be used to determine whether the first sensor data 104 includes emulated sensor data.

For example, physical mobile devices may include one or more positional sensors related to location, orientation, or movement of the physical mobile devices. The positional sensors may include for example, a global positioning system (GPS) sensor, a gyroscope, an accelerometer, a barometer, an altimeter, pedometer, a magnetometer, etc. Additionally, the positional sensors may include a combination of other positional sensors. For example, the positional sensors may include a gravity sensor, a linear acceleration sensor, a gimbal, or a rotation vector sensor, which may individually include or share an accelerometer, a gyroscope, or a magnetometer. The first sensor data 104 may include positional sensor output values that may represent output of the positional sensors in some instances. The positional sensor output values of positional sensors included in physical mobile devices may change often and may be relatively unique at any given time or range of time while the physical mobile devices are being used.

Additionally, physical mobile devices may include one or more biometric sensors that may indicate physiological characteristics of users of the physical mobile devices. For example, the biometric sensors may include a camera (e.g., for facial recognition), a heart-rate sensor, a retinal scanner, a fingerprint scanner, a microphone (e.g., for voice recognition), a breathing rate sensor, heat sensor, a sweat sensor, a palm geometry sensor, etc. The first sensor data 104 may include biometric sensor output values that may represent output of the biometric sensors in some instances. The biometric sensor output values of some biometric sensors included in physical mobile devices may also change often and may be relatively unique at any given time while the physical mobile devices are being used.

Additionally, physical mobile devices may include one or more other sensors that may indicate characteristics of the mobile device or an environment around the physical mobile devices. For example, the other sensors may include a temperature sensor that detect the temperature of the mobile device or the environment outside the mobile device. As another example, the other sensors may include a light sensor that detects light values in an environment outside the mobile device. Another example is a wireless signal sensor that may detect wireless signals that may be in the environment around the physical mobile device such as a WiFi® sensor, a Bluetooth® sensor, etc.

In addition, in some embodiments, physical mobile devices may include one or more system sensors configured to identify system characteristics of the physical mobile devices. The system sensors may include any system, apparatus, device, software routine, etc., that may be configured to identify the system characteristics. The system characteristics may include characteristics that may differ between emulated mobile devices and physical mobile devices. For example, a device running an emulated mobile device may have greater processing capability (e.g., more processing resources, memory, etc.) than that of a physical mobile device. Additionally, a user may have root access with respect to an emulated mobile device whereas users of physical mobile devices typically do not have root access. In addition, kernel versions may vary between emulated mobile devices and physical mobile devices. The system characteristics that may be obtained from system sensors may therefore include in some embodiments a kernel version, a level of access to the device (e.g., whether or not a user has root access), an amount of memory, processing resources, software installed thereon, etc.

In some instances, the first sensor data 104 may include multiple sensor output values for each of one or more sensors over a particular period of time. For example, the first sensor data 104 may include multiple sensor output values that each represent the output of a particular sensor at a particular time within the particular period of time.

The detector 102 may be configured to perform one or more operations related to detecting emulated sensor data or emulated mobile devices. In some embodiments, the detector 102 may be implemented using software that includes code and routines configured to enable a computing system to perform operations. Additionally or alternatively, the detector 102 may be implemented using hardware including a processor, a microprocessor (e.g., to perform or control performance of one or more operations), a field-programmable gate array (FPGA), or an application-specific integrated circuit (ASIC). In some other instances, the detector 102 may be implemented using a combination of hardware and software. In the disclosure, operations described as being performed by the detector 102 may include operations that the detector 102 may direct a computing system to perform. Additionally or alternatively, in some embodiments the detector 102 may be included in or part of a service provider system.

In some embodiments, the detector 102 may be configured to obtain the first sensor data 104. In these or other embodiments, the detector 102 may be configured to obtain the first sensor data 104 from an entity. In some embodiments, the detector 102 may receive the first sensor data 104 from the entity in response to requesting sensor data from the entity. Additionally or alternatively, the detector 102 may be configured to request the sensor data (which may be received as the first sensor data 104) from the entity in response to a request by the entity to access a service provider system. In these or other embodiments, the detector 102 may be configured to request the sensor data from the entity based on the request received from the entity indicating that the entity is a physical mobile device. In these or other embodiments, the entity may periodically send sensor data over a particular period of time such that the first sensor data 104 obtained by the detector 102 may include multiple sensor output values for each of one or more sensors at different times over the particular period of time.

The detector 102 may be configured to analyze the first sensor data 104 to determine whether the first sensor data 104 includes emulated sensor data. In some embodiments, the analysis may include making one or more determinations with respect to the first sensor data 104. The determinations made with respect to the analysis may be based on characteristics of sensor data that may indicate whether the sensor data is emulated.

For example, in some instances, emulated sensor data may include sensor output values that may be relatively static in that the sensor output values given for a particular sensor over a period of time may not change. However, as indicated above, the types of sensor output values included in the first sensor data 104 may be likely to change relatively often for sensors included in a physical mobile device. As such, static sensor output values included in the first sensor data 104 may indicate that the first sensor data 104 includes emulated sensor data. In other words, in various embodiments, "emulated sensor data" may include data that is believed to be artificially generated (e.g., using a computer program) instead of data that was actually generated by a real-world physical sensor, such an accelerometer, GPS locator, orientation sensor, etc.

In some embodiments, the analysis performed by the detector 102 may include a determination as to whether the first sensor data 104 includes static data. For example, in some embodiments, the detector 102 may be configured to monitor over a period of time particular positional sensor output values in the first sensor data 104 that are given for a particular positional sensor. The detector 102 may be configured to determine whether the particular sensor output values change over the period of time. In response to determining that the particular positional sensor output values do not change over the period of time, the detector 102 may be configured to determine that the first sensor data 104 includes static data. In these or other embodiment, in response to determining that the first sensor data 104 includes static data, the detector 102 may be configured to determine that the first sensor data 104 includes emulated sensor data.

In some instances, a physical mobile device may return static sensor data. In some embodiments to avoid improperly designating the first sensor data 104 as including emulated sensor data in instances such as these, the detector 102 may be configured to make a follow up determination based on other information. For example, sensor data between different sensors and/or other information may be analyzed and compared to identify a situation in which a physical mobile device may output static sensor data. For example, a physical mobile device may be in the same place at night while its user is sleeping. The detector 102 may accordingly be configured to compare a location included in the first sensor data 104 with time zone information to determine a time of day. In response to the time of day being at night, it may be determined that the first sensor data 104 may not include emulated sensor data in some embodiments.

As another example, in some instances the physical mobile device may operate as a Point of Sale (POS) device that may be in a relatively stationary configuration. In many instances, a POS device may include specific software installed thereon to facilitate its operation as a POS device. As such, in some embodiments, the first sensor data 104 may include system sensor data indicating POS software is installed on the entity and the detector 102 may be configured to determine that the first sensor data 104 may not include emulated sensor data. Other examples of detecting potentially improper designations of emulated sensor data may include matching different types of sensor data in the first sensor data 104 such as matching location sensor data to environmental sensor data to determine whether they are consistent with each other. Another example may include matching historical points of data between a user of the entity from which the first sensor data 104 is derived and with that of other users that appear to connect with the user. In these or other embodiments a heuristic analysis of comparisons between sensor data to identify potentially inaccurate designations may be used. The above are merely examples of accounting for potentially inaccurate designations.

Conversely, in response to determining that all the sensor output values of the first sensor data 104 change over time, the detector 102 may determine that the first sensor data 104 does not include static data. As detailed further below, a determination that the first sensor data 104 does not include static data may indicate that the first sensor data 104 may not include emulated sensor data.

As another example, in some instances emulated sensor data may include data generated by a computing system that is used as simulation of sensor data (referred to in the disclosure as "computer-simulated data"). The computer-simulated data may include sensor output values that may be generated by the computing system to mimic sensor output values that appear to be generated by sensors of a physical mobile device but that are not actually generated by such sensors. In some instances, the computer-simulated data may be generated such that it may change over time and thus may not be static. As such, in some instances, computer-simulated data may be used as emulated sensor data that may not be detected using a static data determination as described above. However, sensor output values from actual sensors of physical mobile devices may have characteristics that may not be present in computer-simulated data and/or vice versa.

For example, the sensor output values of positional sensors may follow certain patterns or rules that may not be found in computer-simulated data. In some instances, the changes or patterns may be related to location, speed, value ranges of sensor data, types of changes over a period of time, a level of entropy associated with the sensor data, etc. For instance, changes in GPS coordinates from an actual GPS sensor of a physical mobile device over a relatively short period of time may follow a pattern and may not correspond to extreme changes in location. In contrast, computer-simulated data may be randomly generated in some instances and may not follow such patterns. Additionally, GPS coordinates from an actual GPS sensor of a physical mobile device may be more likely to fall within certain geographic regions than others. For instance, GPS coordinates of physical mobile devices are more likely to correspond to land than the ocean, are less likely to correspond to remote areas with little to no network connectivity, etc. As another example, human heart rate may have a certain range and may have a certain pattern in increasing or decreasing. In contrast, computer-simulated data may not follow such patterns. As another example, network addresses (e.g., IP addresses) typically have a geographic location with which they are associates such that a network address location of a physical mobile device and the geographic location of the physical mobile device are typically consistent with each other. However, for computer simulated data the geographic location may not be consistent with the network address location. Sensor output values of accelerometers, magnetometers, and/or gyroscopes as well as of biometric sensors and other sensors of physical mobile devices may similarly have patterns and/or characteristics that computer-simulated data may not have. In some embodiments, the detector 102 may be configured to determine whether the first sensor data 104 includes computer-simulated data based on machine learning that may recognize patterns or rules that may correspond to sensor output values of sensors of physical mobile devices as opposed to computer-simulated data that may be used as sensor output values.

For example, in some embodiments, the detector 102 may be configured to obtain second sensor data 108. The second sensor data 108 may include sensor output values that may be of the same or similar types as the sensor output values of the first sensor data 104. For example, like the first sensor data 104, the second sensor data 108 may include sensor output values that are associated with positional sensors, biometric sensors, system sensors, and/or other sensors.

In some embodiments, the second sensor data 108 may be derived from actual sensors of multiple physical mobile devices. As such, the second sensor data 108 may include sensor output values that follow patterns and rules that may correspond to actual sensor output values. In these or other embodiments, the second sensor data 108 may be collected from physical mobile devices that attempt to access a service provider system. In some embodiments, the second sensor data 108 may be stored in a database that may be accessed by the detector 102.

In these or other embodiments, the detector 102 may be configured to obtain computer-simulated data 110 that may be configured to mimic sensor output values. In some embodiments, the computer-simulated data 110 may be generated in a manner that may be similar to how computer-simulated data used as emulated sensor data may be generated. In some embodiments, the detector 102 may be configured to obtain the computer-simulated data 110 by generating the computer-simulated data 110. In these or other embodiments, the computer-simulated data 110 may have been previously generated and stored in a database that may be accessed by the detector 102 to obtain the computer-simulated data 110.

In some embodiments, the detector 102 may be configured to apply machine learning to the second sensor data 108 and the computer-simulated data 110. The machine learning may be applied to the second sensor data 108 and the computer-simulated data 110 to generate a model or classifier that may differentiate between the second sensor 108 and the computer-simulated data 110. For example, in some embodiments, a machine learning algorithm such as a support vector machine (SVM) algorithm or a random forest algorithm may be used to generate a classifier that differentiates between the second sensor data 108 and the computer-simulated data 110.

In some embodiments, the machine learning may be used to create a dynamic profile of physical sensor data and the classifier may be generated based on the dynamic profile. In some instances, the dynamic profile generation may include a time based analysis that may be used to analyze user habits over the course of time. Further, the dynamic profile generation may include non-time based analysis that may be used to analyze usage of physical mobile devices and environmental factors such as speed of movement while with the physical mobile devices (e.g., walking speed), locations of the physical mobile devices in a hand, etc. In some embodiments, a feature vector may be generated based on the time based and the time based analysis. For example, in some embodiments, the feature vector may be based on physical sensor data that is collected at a certain frequency (e.g., every 10 seconds). Further, the feature vector may be based on an average sensor value for each sensor per minute, hour, day, week, month, year, etc. In some embodiments, the feature vector may be based on a determined standard deviation of each sensor value type (which may be based on the average), a determined maximum value of each sensor value type, a determined minimum value of each sensor value type, a difference between a current sensor value and a previous sensor value, an amount of time the sensors are active, and statistics of the previous week or month of sensor values associated with individual mobile devices. The feature vector may be used with a supervised machine learning with respect to they physical sensor data and computer-simulated data to generate the classifier.

In some embodiments, the classifier may be configured to receive generic sensor data as an input and to output a classification as to whether the received generic sensor data is actual sensor data or computer-simulated data. In these or other embodiments, the detector 102 may be configured to provide the first sensor data 104 as an input to the classifier and the classifier may designate the first sensor data 104 as including actual sensor data or computer-simulated data. Although the machine learning is described as being performed by the detector 102 in the present description, in some embodiments, the machine learning may be performed elsewhere to generate the classifier. In these or other embodiments, the classifier may be stored in a database that may be accessed by the detector 102 while determining whether the first sensor data 104 includes machine-generated data.

In some embodiments, in response to determining that the first sensor data 104 includes computer-simulated data, the detector 102 may determine that the first sensor data 104 includes emulated sensor data. Conversely, a determination that the first sensor data 104 includes actual sensor data may indicate that the first sensor data 104 may not include emulated sensor data.

As another example, in some instances emulated sensor data may include actual sensor data from a physical mobile device that is being reused as emulated sensor data. For example, in some instances, sensor data of a physical mobile device may be recorded over a particular period of time and the recorded sensor data may be used as emulated sensor data for an emulated mobile device. Additionally or alternatively, a physical mobile device may include an emulator stored thereon and may be configured to generate multiple emulated mobile devices. In these or other embodiments, the sensor data of the physical mobile device may be used as emulated sensor data for each of the emulated mobile devices. The reused sensor data may not be static over a particular period of time and may also follow patterns and rules of actual sensor data. As such, the static and computer-simulated determinations described above may not identify reused sensor data in some instances. However, as discussed above, sensor data of a particular physical mobile device may be relatively unique as compared to sensor data of other physical mobile devices. As such, the likelihood that more than one physical mobile device may have the same sensor data is very low. In some embodiments, the detector 102 may be configured to determine whether the first sensor data 104 includes reused sensor data that may be used as emulated sensor data based on the relatively low likelihood that more than one physical mobile device may have the same sensor data.

For example, the detector 102 may be configured to compare the first sensor data 104 with third sensor data 112 to determine whether or not the first sensor data 104 includes reused sensor data. The third sensor data 112 may include sensor output values that may be of the same or similar types as the sensor output values of the first sensor data 104. For example, like the first sensor data 104, the third sensor data 112 may include sensor output values that correspond to positional sensors, biometric sensors, system sensors, and/or other sensors.

In some embodiments, the third sensor data 112 may be collected from entities that attempt to access the service provider system as physical mobile devices. In some embodiments, at least some of the third sensor data 112 may be collected at the same or substantially the same time that the first sensor data 104 may be obtained. In these or other embodiments, at least some of the third sensor data 112 may have been collected before reception of the first sensor data 104. In some embodiments, the third sensor data 112 may be stored in a database that may be accessed by the detector 102. Additionally or alternatively, in some embodiments, the third sensor data 112 may include at least some of the second sensor data 108.

In some embodiments, the detector 102 may be configured to compare the first sensor data 104 against the third sensor data 112 to determine whether the first sensor data 104 includes reused sensor data. For example, the detector 102 may be configured to determine whether at least some of the first sensor data 104 matches any of the third sensor data 112 based on the comparison. In some embodiments, in response to determining that at least a portion of the first sensor data 104 matches any of the third sensor data 112, the detector 102 may be configured to determine that the first sensor data 104 includes reused sensor data. In these or other embodiments, in response to determining that the first sensor data 104 includes reused sensor data, the detector 102 may determine that the first sensor data 104 includes emulated sensor data. Conversely, in response to determining that none of the first sensor data 104 matches any of the third sensor data 112, the detector 102 may be configured to determine that the first sensor data 104 does not include reused data. As discussed in further detail below, a determination that the first sensor data 104 does not include reused data may indicate that the first sensor data 104 may not include emulated sensor data.

By way of additional example, in some embodiments, the detector 102 may be configured to compare a first set of sensor output values included in the first sensor data 104 against one or more third sets of sensor output values included in the third sensor data 112. A "set of sensor output values" may include sensor output values that are associated with one or more sensors for a particular time for a particular entity. Additionally or alternatively, the detector 102 may be configured to determine whether the first set of sensor output values matches one or more third sets of sensor output values of the third sensor data 112 based on the comparison. In some embodiments, in response to determining that the first set of sensor output values matches one or more third sets of sensor output values, the detector 102 may be configured to determine that the first sensor data 104 includes reused sensor data. In these or other embodiments, in response to determining that the first sensor data 104 includes reused sensor data based on the first set matching one or more third sets, the detector 102 may determine that the first sensor data 104 includes emulated sensor data.

In some embodiments, a hashing function may be applied to the first sensor data 104 and the third sensor data 112. In these and other embodiments, the hashing function may be applied to a first set of the first sensor data 104 to generate a first hash value and the hashing function may be applied to a third set of the third sensor data 112 to generate a second hash value. The first and second hash values may be compared to determine if the first and second hash values match or substantially match. In response to the first and second hash values matching, it may be determined that the first set of the first sensor data 104 matches the third set of the third sensor data 112. In some embodiments, the hashing function may be performed on all of the first sets of the first sensor data 104 and all of the third sets of the third sensor data 112 and the resulting hash values may be compared to determine whether or not any of the first sensor data 104 and the third sensor data 112 include one or more sets of sensor data that are the same.

Additionally or alternatively, in some embodiments once sensor data has been determined to be reused sensor data, that sensor data may be stored for later reference. For example, the sensor data determined to be reused sensor data may be stored in a database and the first sensor data 104 may first be compared against the stored reused sensor data before being compared against the third sensor data 112 to determine whether the first sensor data 104 is the same as the stored reused sensor data, which may reduce computational requirements. In some embodiments, the stored reused sensor data may be stored in a hashtable in which a key to the hashes is the reused sensor data and an identifier of the entity from which the reused sensor data was received. The first sensor data 104 and identifier of the corresponding entity may be hashed and compared with the hashes in the hashtable to determine whether there is a match in some embodiments. Additionally or alternatively, in some instances, the third sensor data 112 that may be compared against the first sensor data 104 may be filtered to include third sensor data 112 that has been received within a certain period of time since reception of the first sensor data 104 to also improve computational efficiency. The certain period of time may be based on an average length of a denial of service attack in some embodiments.

In some instances, in order to avoid a possible improper designation of reused sensor data, the detector 102 may be configured to generate a challenge in response to determining that the first sensor data 104 includes reused sensor data. The challenge may include instructions to the user to perform an operation that may provide information indicating that the entity from which the first sensor data 104 is obtained is a physical mobile device. For example, the challenge may include an instruction to shake the device, take a picture of surroundings (which may be compared against known pictures of a location indicated in the first sensor data 104), make a comment, type an answer to a question, etc. In some embodiments, the response to the challenge may be included in updated first sensor data 104.

In some embodiments, the detector 102 may be configured to make the static data, computer-simulated data and the reused sensor data determinations that may be included in the analysis in a hierarchal order. Additionally or alternatively, the hierarchal order may be based on detectability of emulated sensor data by the different determinations. For example, as indicated above, a determination that the first sensor data 104 includes static data may indicate that the first sensor data 104 includes emulated sensor data. However, a determination that the first sensor data 104 does not include static data may not indicate that the first sensor data 104 includes real sensor or is from a physical mobile device. Such a determination may not be dispositive because computer-simulated data and reused sensor data that may be used as emulated sensor data may not be static. Additionally, as indicated above, a determination that the first sensor data 104 includes computer-simulated data may indicate that the first sensor data 104 includes emulated sensor data. Similar to the above discussion, however, a determination that the first sensor data 104 does not include computer-simulated data may not indicate that the first sensor data 104 includes real sensor or is from a physical mobile device. Such a determination may not be dispositive because reused sensor data that may be used as emulated sensor data may not follow patterns or rules that may be used to identify computer-simulated data.

Based on the above principles, the hierarchal order used in making the determinations may be as follows in some embodiments: (1) the static data determination; (2) the computer-simulated data determination; and (3) the reused data determination. For example, in some embodiments, the detector 102 may be configured to first determine whether the first sensor data 104 includes static data. The detector 102 may be configured to determine that the first sensor data 104 includes emulated sensor data in response to determining that the first sensor data 104 includes static data and may not perform the computer-simulated data determination or the reused data determination. However, in response to determining that the first sensor data 104 does not include static data, the detector 102 may be configured to next determine whether the first sensor data 104 includes computer-simulated data.

The detector 102 may be configured to determine that the first sensor data 104 includes emulated sensor data in response to determining that the first sensor data 104 includes computer-simulated data and may not perform the reused data determination. However, in response to determining that the first sensor data 104 does not include computer-simulated data, the detector 102 may be configured to next determine whether the first sensor data 104 includes reused sensor data. The detector 102 may be configured to determine that the first sensor data 104 includes emulated sensor data in response to determining that the first sensor data 104 includes reused data. In response to determining that the first sensor data 104 does not include reused data (after already determining that the first sensor data 104 does not include static data or computer-simulated data), the detector 102 may be configured to determine that the first sensor data 104 does not include emulated sensor data. Making the determinations based on the hierarchal order described may reduce an amount of processing performed in analyzing the first sensor data 104. In some examples, these determinations may be conducted in parallel.

In some embodiments, the detector 102 may be configured to output the entity type determination 106 based on determining whether or not the first sensor data 104 includes emulated sensor data. For example, in some embodiments, the detector 102 may be configured to determine that the entity from which the first sensor data 104 may be obtained is an emulated mobile device in response to determining that the first sensor data 104 includes emulated sensor data. In these or other embodiments, the detector 102 may be configured to output as the entity type determination 106 that the entity type is an emulated mobile device. Conversely, the detector 102 may be configured to determine that the entity from which the first sensor data 104 may be obtained is a physical mobile device in response to determining that the first sensor data 104 does not include emulated sensor data. In these or other embodiments, the detector 102 may be configured to output as the entity type determination 106 that the entity type is a physical mobile device. Therefore, the entity type determination 106 may provide an identification as to whether the entity is potentially an emulated mobile device by designating the entity as a physical mobile device or an emulated mobile device.

In some embodiments, the entity type determination 106 may be used to determine a level of access to a service provider system of the entity from which the first sensor data 104 may be obtained. For example, in some embodiments, access to the service provider system may be limited or restricted for the entity in response to the entity type determination 106 indicating that the entity is determined to be an emulated mobile device as compared to in response to the entity type determination 106 indicating that the entity is determined to be a physical mobile device. In some embodiments, limited or restricted access may include a complete denial of access to the service provider system.

The system 100 may accordingly be used to identify potential emulated mobile devices by making the determinations described above. Additionally, the identification of the potential emulated mobile devices may reduce attack vulnerabilities of service provider systems.

One skilled in the art, after reviewing this disclosure, may recognize that modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described.

Figure 2:
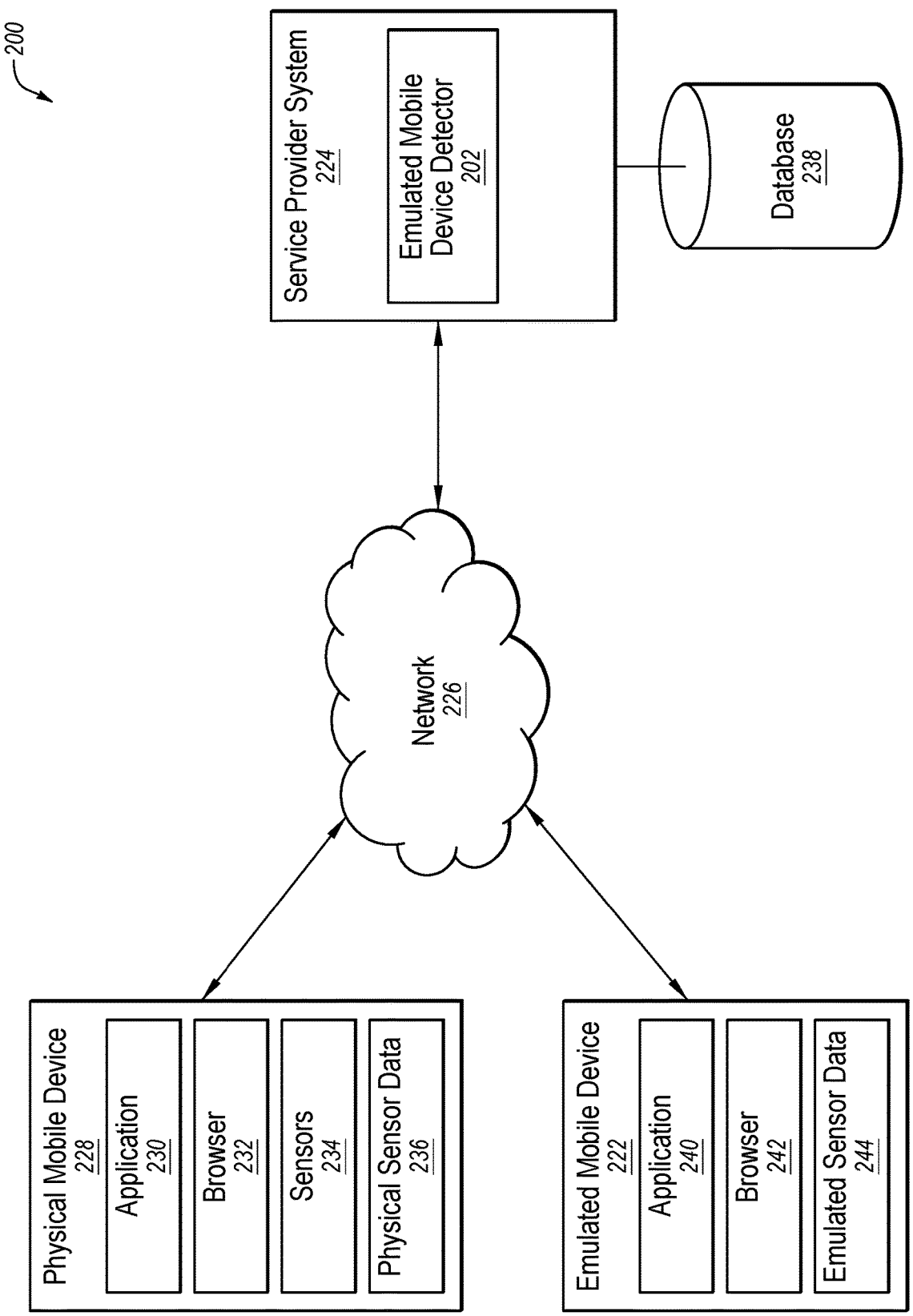
FIG. 2 is a diagram illustrating an example environment in which an emulated mobile device detector may be implemented.

FIG. 2 is a diagram illustrating an example environment 200 in which an emulated mobile device detector 202 ("detector 202") may be implemented. The environment 200 may be according to one or more embodiments, such as the embodiments shown in the accompanying figures. The environment 200 may include a service provider system 224 ("system 224") that includes the detector 202, a physical mobile device 228 ("physical device 228"), and an emulated mobile device 222 ("emulated device 222"). Additionally, the system 224, physical device 228 and the emulated device 222 may be communicatively coupled to a network 226 of the environment 200.

As described below, the system 224 may be configured to receive requests to access and engage with the system 224 from the physical device 228 and/or the emulated device 222. The system 224 may be configured to make a determination as to whether the physical device 228 or the emulated device 222 are physical mobile devices or emulated mobile devices and may provide access based on the determination.

The network 226 may include a wired network, a wireless network, or any combination thereof configured to communicatively couple devices or systems. For example, the network 226 may communicatively couple the physical device 228 and the emulated device 222 to the system 224. The network 226 may include any suitable configuration or configurations including a star configuration, token ring configuration, or other configurations. The network 226 may include a local area network (LAN), a wide area network (WAN) (e.g., the Internet), and/or other interconnected data paths across which multiple devices or systems may communicate. In some embodiments, the network 226 may include a peer-to-peer network. Additionally or alternatively, the network 226 may also be coupled to or include portions of a telecommunications network that may enable communication of data in a variety of different communication protocols. In some embodiments, the network 226 may include BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and/or the like.

The system 224 may be associated with a service provider that may provide any of various network accessible services such as for example, financial services, e-commerce services, data storage services, data processing services, entertainment services, informational services, educational services, etc. In some embodiments, the system 224 may be configured as a server system that includes one or more computing systems configured to perform operations related to providing the network accessible services of the service provider. As indicated above, the system 224 may include the detector 202, which may be similar or analogous to the detector 102 described above with respect to FIG. 1.

In some embodiments, the system 224 may be communicatively coupled to or include a database 238. In some embodiments, the database may include data stored thereon that may be used to make determinations regarding whether an entity is a physical mobile device. For example, the database 238 may include the second sensor data 108, the third sensor data 112, the computer-simulated data 110, or the classifier described above with respect to FIG. 1 in some embodiments. The database may include any suitable non-transitory computer-readable storage media such as the computer-readable storage media described below with respect to FIG. 3.

The physical device 228 may be any suitable system, apparatus, or device that may be configured as a mobile device. For example, the physical device 228 may be a smartphone or a tablet computer in some embodiments.

The physical mobile device 228 may include one or more sensors 234. In some embodiments, the sensors 234 may include one or more positional, biometric, or other sensors such as described above with respect to FIG. 1. Additionally or alternatively, in some embodiments the sensors 234 may be configured to generate or provide physical sensor data 236 that includes sensor output values that may represent the output of the sensors 234. In some embodiments, the physical sensor data 236 may be an example of the first sensor data 104 described with respect to FIG. 1. Additionally or alternatively, the physical sensor data 236 may be an example of the second sensor data 108 or the third sensor data 112 also described above with respect to FIG. 1.

The physical device 228 may be configured to submit requests to the system 224 to access or engage in services provided by the system 224. For example, to engage with the system 224, the physical device 228 may initiate a mobile application 230 ("application 230") or browser 232 which may generate a request to access the system 224. In some embodiments, the application 230 may be an application downloaded from an app store to the physical device 228. Additionally or alternatively, the application 230 may provide a compatible and secure interface with the system 224. In some embodiments, the application 230 or browser 232 may send requests to the system 224, and may respond to requests or inquiries received from the system 224 by providing data to the system 224.

The emulated device 222 may be configured as software executing on one or more processors to provide an interface that appears to system 224 as an interface from a physical mobile device, such as the physical device 228. For example, the emulated device 222 may include a mobile application 240 ("application 240") or a browser 242 that may be similar or analogous to the application 230 and the browser 232, respectively, of the physical device 228. Accordingly, the emulated device 222 may use the application 240 or the browser 242 to seek the services of the system 224 in a manner that appears to be derived from a physical mobile device.

In these or other embodiments, the emulated device 222 may include emulated sensor data 244. The emulated sensor data 244 may include sensor output values that may be associated with physical sensors in that the sensor output values may represent the output of the physical sensors. For example, the emulated sensor data 244 may include sensor output values that may represent the output of sensors such as the sensors 234 of the physical device 228. Further, in some embodiments, the emulated sensor data 244 may include static data, computer-simulated data, and/or reused sensor data that may be used as sensor output values. In some embodiments, the emulated sensor data 244 may be associated with positional, biometric, or other sensors. In some instances, the emulated sensor data 244 may be used by the emulated device 222 to help the emulated device 222 appear to be a physical mobile device. In some embodiments, the emulated sensor data 244 may be an example of the first sensor data 104 of FIG. 1.

As indicated above, the system 224 may receive requests from the physical device 228 and/or the emulated device 222 to access and engage with the system 224. For example, the system 224 may receive a first request from the physical device 228, e.g., via the application 230, to access the system 224. The system 224 may also receive a second request from the emulated device 222, e.g., via the application 240, to access the system 224. In some instances, both the first request and the second request may provide an indication that they are from physical mobile devices.

Based on the indications that the first request and the second request are from physical mobile devices, the system 224 may request sensor data from the physical device 228 and the emulated device 222. In some embodiments, the detector 202 may be configured to initiate the requests for sensor data. The physical device 228 may send the physical sensor data 236 to the system 224 in response to receiving a first data request for sensor data from the system 224. Further, the emulated device 222 may send the emulated sensor data 244 to the system 224 in response to receiving a second data request for sensor data from the system 224.

In some embodiments, the system 224 may make a determination as to whether the physical device 228 is a physical mobile device or an emulated mobile device based on the received physical sensor data 236. Similarly, the system 224 may make a determination as to whether the emulated device 222 is a physical mobile device or an emulated mobile device based on the received emulated sensor data 244. For example, in some embodiments the detector 202 may be configured to analyze the physical sensor data 236 and the emulated sensor data 244 to determine whether the physical sensor data 236 or the emulated sensor data 244 include static data, computer-readable data, and/or reused sensor data such as described above with respect to FIG. 1. In some embodiments, the detector 202 may be configured to access data stored on the database 238 in determining whether the physical sensor data 236 or the emulated sensor data 244 include static data, computer-readable data, and/or reused sensor data.

In some instances, the detector 202 may determine that the physical sensor data 236 does not include static data, computer-readable data, or reused sensor data such that the detector 202 may determine that the physical sensor data 236 is actual physical sensor data and not emulated sensor data. In some embodiments, in response to determining that the physical sensor data 236 is actual physical sensor data, the detector 202 may be configured to determine that the physical device 228 is an actual physical mobile device and not an emulated mobile device. Additionally or alternatively, in response to the detector 202 determining that the physical device 228 is an actual physical mobile device, the system 224 may allow the physical device 228 to access and engage with the system 224. In some embodiments, the detector 202 may be configured to grant the access.

In some instances, the detector 202 may determine that the emulated sensor data 244 includes static data, computer-readable data, or reused sensor data such that the detector 202 may determine that the emulated sensor data 244 is emulated sensor data and not physical sensor data. In some embodiments, in response to determining that the emulated sensor data 244 is emulated sensor data, the detector 202 may be configured to determine that the emulated device 222 is an emulated mobile device and not a physical mobile device. Additionally or alternatively, in response to the detector 202 determining that the emulated device 222 is an emulated mobile device, the system 224 may limit or deny access of the emulated device 222 to the system 224. In some embodiments, the detector 202 may be configured to limit or deny the access.

One skilled in the art, after reviewing this disclosure, may recognize that modifications, additions, or omissions may be made to FIG. 2 without departing from the scope of the disclosure. For example, the environment 200 may include any number of physical mobile devices or emulated mobile devices. Further, each of the devices and systems illustrated may include any number of other elements not expressly described. In addition, one or more of the operations described above with respect to determining whether the physical device 228 and the emulated device 222 are physical mobile devices or emulated mobile devices may be performed at the same time or at different times.

Figure 3:
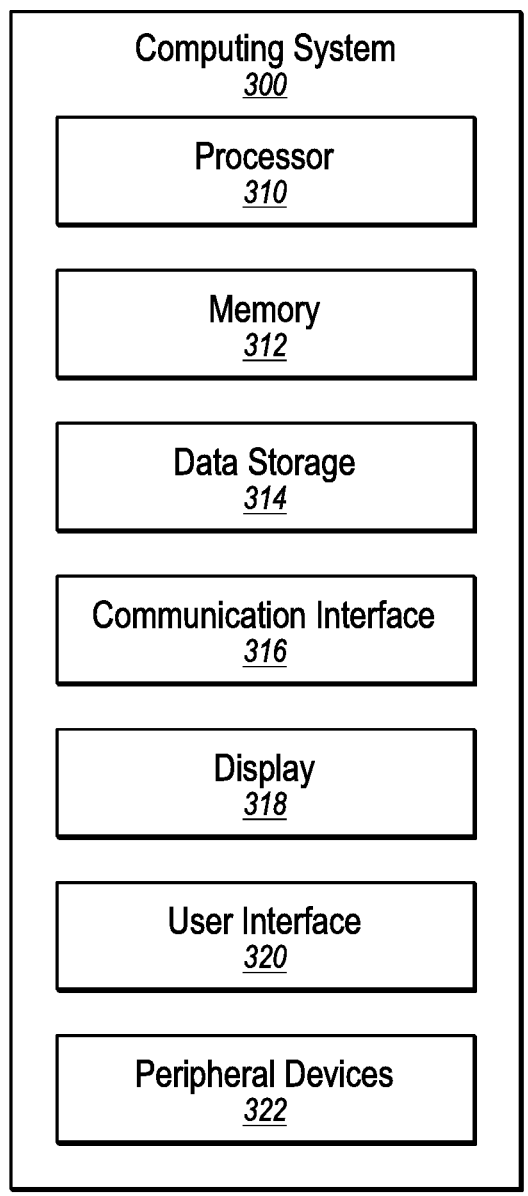
FIG. 3 illustrates an example computing system that may be used in a system configured to identify a potential emulated mobile device.

FIG. 3 illustrates an example computing system 300 ("system 300") that may be used in a system configured to identify a potential emulated mobile device. The system 300 may be arranged in accordance with at least one embodiment described in the present disclosure. The system 300 may include a processor 310, a memory 312, data storage 314, a communication interface 316, a display 318, a user interface unit 320, and a peripheral device 322, which all may be communicatively coupled. In some embodiments, at least a portion of the system 300 may be part of any of the systems or devices described in this disclosure. For example, For example, the system 300 may be included in or part of the system 224 of FIG. 2. Additionally or alternatively, the system 300 may be included in or part of the physical device 228 of FIG. 2.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312, the data storage 314, or the memory 312 and the data storage 314. In some embodiments, the processor 310 may fetch program instructions from the data storage 314 and load the program instructions into the memory 312.

After the program instructions are loaded into the memory 312, the processor 310 may execute the program instructions. For example, the system 300 may be part of the system 224 of FIG. 2. In these and other embodiments, the detector 202 may be stored in the memory 312 and the may be loaded and executed by the processor 310 to perform operations with respect to identifying potential emulated mobile devices.

The memory 312 and the data storage 314 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations as describe in this disclosure.

The communication interface 316 may include any component, device, system, or combination thereof that is configured to transmit or receive information over a network. In some embodiments, the communication interface 316 may communicate with other devices at other locations, the same location, or even other components within the same system. For example, the communication interface 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication interface 316 may permit data to be exchanged with a network and/or any other suitable devices or systems, such as those described in the present disclosure. For example, when the system 300 is included in the system 224 of FIG. 2, the communication interface 316 may allow the system 224 to communicate with the physical device 228 and the emulated device 222 over the network 226 of FIG. 2.

The display 318 may be configured as one or more displays, like an LCD, LED, or other type of display. The display 318 may be configured to present video, text captions, user interfaces, and other data as directed by the processor 310. For example, when the system 300 is included in the system 224 of FIG. 2, the display 318 may be configured to present operational information related to the system 224.

The user interface unit 320 may include any device to allow a user to interface with the system 300. For example, the user interface unit 320 may include a mouse, a track pad, a keyboard, and/or a touchscreen, among other devices. The user interface unit 320 may receive input from a user and provide the input to the processor 310.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 300 or otherwise generated by the system 300.

One skill in the art, after reviewing this disclosure, may recognize that modifications, additions, or omissions may be made to the system 300 without departing from the scope of the present disclosure. For example, the system 300 may include more or fewer components than those explicitly illustrated and described.

Figure 4:
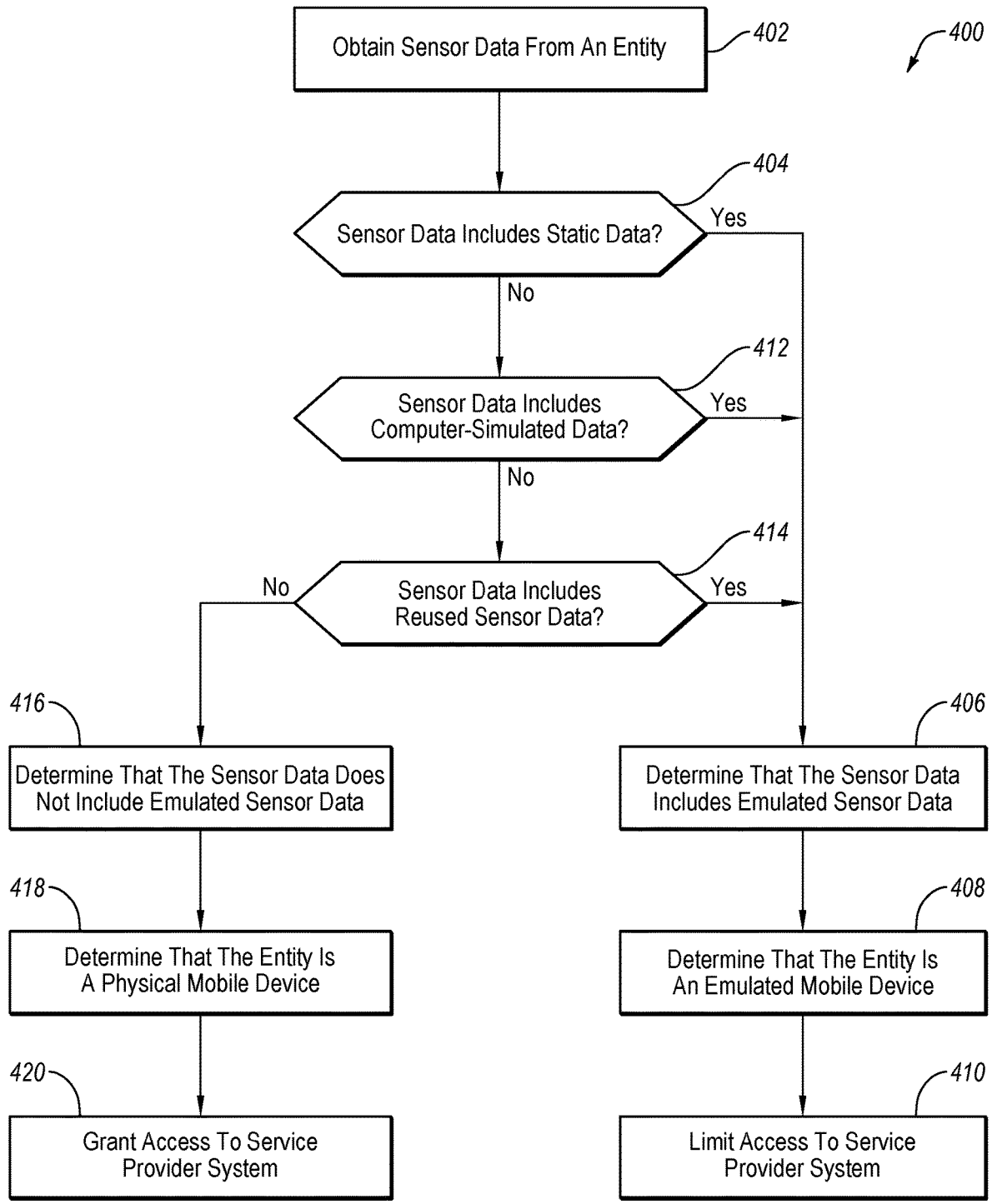
FIG. 4 is a flow diagram illustrating one embodiment of a process of identifying a potential emulated mobile device.

FIG. 4 is a flow diagram illustrating one embodiment of a process 400 of identifying a potential emulated mobile device. The process 400 may be arranged in accordance with at least one embodiment described herein. One or more operations of the process 400 may be performed by a system or device, such as the detectors 102 or 202 of FIGS. 1 and 2 or by the system 224 of FIG. 2. In these and other embodiments, the method 400 may be performed based on the execution of instructions stored on one or more non-transitory computer-readable media. Although illustrated as discrete blocks, various blocks of process 400 may be divided into additional blocks, combined into fewer blocks, or eliminated, depending on the desired implementation.

At block 402, sensor data associated with an entity may be obtained. In some embodiments, the sensor data may include sensor output values that may be associated with one or more sensors of a physical mobile device. For example, in some embodiments, the first sensor data 104 of FIG. 1 may be obtained at block 402. In some embodiments, the sensor data may be obtained in response to a request for the sensor data from the entity. Additionally or alternatively, the request for the sensor data may be in response to a request by the entity to access a service provider system. In these or other embodiments, the request for the sensor data from the entity may be based on the request to access the service provider system received from the entity indicating that the entity is a physical mobile device. In these or other embodiments, the entity may periodically send sensor data over a particular period of time such that the sensor data obtained at block 402 may include multiple sensor output values for each of one or more sensors at different times over the particular period of time.

At block 404, it may be determined whether the obtained sensor data includes static data. In some embodiments, the static data determination may be as described above with respect to FIG. 1. In response to determining that the obtained sensor data includes static data, the process 400 may proceed to block 406. In response to determining that the obtained sensor data does not include static data, the process 400 may proceed to block 412.

At block 406, it may be determined that the obtained sensor data includes emulated sensor data. At block 408 it may be determined that the entity associated with the obtained sensor data is an emulated mobile device based on the determination that the obtained sensor data includes emulated sensor data. Therefore, the determination at block 408 may provide an identification that the entity is a potential emulated mobile device by designating the entity as an emulated mobile device. At block 410, access to the service provider system may be limited or denied in response to determining that the entity is an emulated mobile device.

At block 412, it may be determined whether the obtained sensor data includes computer-simulated data. In some embodiments, the computer-simulated data determination may be as described above with respect to FIG. 1. In response to determining that the obtained sensor data includes computer-simulated data, the process 400 may proceed to block 406. In response to determining that the obtained sensor data does not include computer-simulated data, the process 400 may proceed to block 414.

At block 414, it may be determined whether the obtained sensor data includes reused sensor data. In some embodiments, the reused sensor data determination may be as described above with respect to FIG. 1. In response to determining that the obtained sensor data includes reused sensor data, the process 400 may proceed to block 406. In response to determining that the obtained sensor data does not include computer-simulated data, the process 400 may proceed to block 416.

At block 416, it may be determined that the obtained sensor data does not include emulated sensor data. At block 418 it may be determined that the entity associated with the obtained sensor data is a physical mobile device based on the determination that the obtained sensor data does not include emulated sensor data. Therefore, the determination at block 418 may provide an identification that the entity is not an emulated mobile device by designating the entity as a physical mobile device. At block 420, access to the service provider system may be granted in response to determining that the entity is a physical mobile device.

One skilled in the art, after reviewing this disclosure, may recognize that modifications, additions, or omissions may be made to the process 400 without departing from the scope of the disclosure. For example, the operations of the process 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. For example, the process 400 is described as being implemented and performed according to the hierarchal order described above with respect to FIG. 1. However, in some embodiments, the operations of the process 400 may be rearranged such that the hierarchal order may not be followed.

As noted above, various embodiments of the present disclosure may aide in the detection of emulated mobile devices. Additionally, emulated mobile device detection may limit, and possibly prevent, attacks on service provider systems. Accordingly, various embodiments may improve the way a mobile device-accessible service provider system operates and/or may improve computer-related technologies, such as emulated mobile device detection and/or protection from network-based attacks. In addition, various embodiments may improve technological fields of, for example, computer security, cybersecurity, and/or information technology (IT) security.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   receiving, from an entity indicating that it is a physical mobile device, a request to access a service provider system;
   requesting first sensor data from a sensor of the entity based on the received request; receiving the first sensor data from the entity in response to requesting the first sensor data; analyzing the first sensor data, the analyzing being based on a plurality of determinations that include:
     determining whether the first sensor data includes static data based on whether the first sensor data changes over a period of time;
     in response to a result of the determining whether the first sensor data includes static data indicating that static data is not included in the first sensor data, determining whether the first sensor data includes computer-simulated data based on other computer-simulated data and second sensor data of one or more other genuine physical mobile devices; and
     in response to a result of the determining whether the first sensor data includes computer-simulated data indicating that computer-simulated data is not included, determining whether the first sensor data includes reused sensor data based on a comparison of the first sensor data against third sensor data previously obtained from one or more other entities and stored in a database, wherein the comparison of the first sensor data against the third sensor data comprises a determination whether at least a portion of the first sensor data is a reuse of at least a corresponding portion of the third sensor data;
   in response to determining that the first sensor data includes emulated sensor data based on one or more of the plurality of determinations of the analyzing, determining that the entity is an emulated mobile device and not a genuine physical device in response to determining that the first sensor data includes emulated sensor data; and
   limiting access of the entity to the service provider system in response to determining that the entity is the emulated mobile device.

2. The method of claim 1, wherein determining that the first sensor data does not include static data comprises monitoring output values of the sensor at different points in time during the period of time, and determining that at least one output value corresponding to a particular point in time differs from at least one other output value corresponding to a different point in time.

3. The method of claim 1, further comprising determining that the first sensor data includes emulated sensor data in response to determining that the first sensor data includes computer-simulated data.

4. The method of claim 1, further comprising determining that the first sensor data includes emulated sensor data in response to determining that the first sensor data includes reused sensor data.

5. The method of claim 1, further comprising obtaining a classifier that classifies generic data as computer-simulated data or actual sensor data based on the other computer-simulated data and the second sensor data, wherein determining whether the first sensor data includes computer-simulated data includes providing the first sensor data as an input to the classifier.

6. The method of claim 1, wherein the comparison of the first sensor data against the third sensor data includes applying a hashing function to the first sensor data and the third sensor data.

7. Non-transitory computer-readable storage media configured to store instructions that cause a system to perform operations, the operations comprising:
   obtaining sensor data from a sensor of an entity, the sensor data including sensor output values associated with one or more sensors of a physical mobile device;
   analyzing the obtained sensor data, the analyzing including performing one or more determinations selected from a group of determinations consisting of:
      determining whether the obtained sensor data includes static data;
      in response to a result of the determining whether the obtained sensor data includes static data indicating that static data is not included, determining whether the obtained sensor data includes computer-simulated data; and
      in response to a result of the determining whether the obtained sensor data includes computer-simulated data indicating that computer-simulated data is not included, determining whether the obtained sensor data includes reused sensor data by comparing the obtained sensor data to stored sensor data previously received from other physical mobile devices and stored in a database, wherein the comparison of the obtained sensor data against the stored sensor data comprises a determination whether at least a portion of the obtained sensor data is a reuse of at least a corresponding portion of the stored sensor data; and
   determining whether the obtained sensor data includes emulated sensor data from an emulated mobile device that is not a genuine physical mobile device based on one or more of the determinations performed from the group of determinations.

8. The non-transitory computer-readable media of claim 7, wherein determining that the obtained sensor data does not include static data comprises obtaining sensor data at different points in time, and determining that the obtained sensor data changes between two or more points in time.

9. The non-transitory computer-readable media of claim 7, wherein determining whether the obtained sensor data includes computer-simulated data is based on other computer-simulated data and other sensor data of one or more physical mobile devices.

10. The non-transitory computer-readable media of claim 9, wherein the operations further include determining a classifier that classifies generic data as computer-simulated data or actual sensor data based on the other computer-simulated data and the other sensor data, wherein determining whether the obtained sensor data is computer-simulated data includes providing the obtained sensor data as an input to the classifier.

11. The non-transitory computer-readable media of claim 7, wherein determining whether the obtained sensor data includes reused sensor data is based on a comparison of the obtained sensor data against other sensor data obtained from other entities.

12. The non-transitory computer-readable media of claim 11, wherein the comparison of the obtained sensor data against the other sensor data includes applying a hashing function to the obtained sensor data and the other sensor data.

13. The non-transitory computer-readable media of claim 7, wherein the operations further comprise determining that the obtained sensor data includes emulated sensor data in response to determining that the obtained sensor data includes static data.

14. The non-transitory computer-readable media of claim 7, wherein the operations further comprise determining that the obtained sensor data includes emulated sensor data in response to determining that the obtained sensor data includes computer-simulated data.

15. The non-transitory computer-readable media of claim 7, wherein the operations further comprise determining that the obtained sensor data includes emulated sensor data in response to determining that the obtained sensor data includes reused sensor data.

16. The non-transitory computer-readable media of claim 7, wherein the operations further comprise:
   determining whether the obtained sensor data includes computer-simulated data in response to determining that the obtained sensor data does not include static data; and determining whether the obtained sensor data includes reused sensor data in response to determining that the obtained sensor data does not include computer-simulated data.

17. The non-transitory computer-readable media of claim 7, wherein the operations further comprise:
   determining that the entity is the emulated mobile device based on determining that the obtained sensor data includes emulated sensor data; and
   limiting access of the entity to a service provider system in response to determining that the entity is the emulated mobile device.

18. The non-transitory computer-readable media of claim 7, wherein the operations further comprise:
   determining that the entity is the physical mobile device based on determining that the obtained sensor data does not include emulated sensor data; and
   allowing access by the entity to a service provider system in response to determining that the entity is the genuine physical mobile device.

19. The non-transitory computer-readable media of claim 7, wherein the operations further comprise determining that the obtained sensor data does not include emulated sensor data in response to determining that the obtained sensor data does not include static data, computer-simulated data, or reused sensor data.

20. A system comprising:
   a communication interface configured to receive first sensor data from an entity indicating that it is a physical mobile device, the first sensor data including sensor output values associated with one or more sensors of the physical mobile device;
   a database configured to store:

second sensor data of one or more genuine physical mobile devices;

third sensor data previously obtained from one or more other entities and computer-simulated data configured to represent sensor data;

one or more processors communicatively coupled to the communication interface and the database; and a non-transitory computer-readable storage media communicatively coupled to the one or more processors, the non-transitory computer-readable storage media including instructions stored thereon that, in response to execution by the one or more processors, cause the system to perform operations, the operations comprising:

obtaining the first sensor data;

analyzing the first sensor data, the analyzing including performing one or more determinations selected from a group of determinations consisting of:

determining whether the first sensor data includes static data by determining whether the first sensor data changes over a period of time;

in response to a result of the determining whether the first sensor data includes static data indicating that static data is not included in the first sensor data, determining whether the first sensor data includes computer-simulated data based on the computer-simulated data stored in the database and the second sensor data stored in the database;

in response to a result of the determining whether the first sensor data includes computer-simulated data indicating that computer-simulated data is not included, determining whether the first sensor data includes reused sensor data based on a comparison of the first sensor data against the third sensor data stored in the database, wherein the comparison of the first sensor data against the third sensor data comprises a determination whether at least a portion of the first sensor data is a reuse of at least a corresponding portion of the third sensor data;

determining that the first sensor data includes emulated sensor data based on one or more of the determinations performed from the group of determinations;

determining whether the entity is an emulated mobile device or a genuine physical mobile device based on determining whether the obtained first sensor data includes emulated sensor data; and providing the entity access to a service provider system in response to determining that the entity is the genuine physical mobile device in place of limiting access of the entity to the service provider system in response to determining that the entity is the emulated mobile device.

\* \* \* \* \*